(12) United States Patent
Brouillette et al.

(10) Patent No.: US 7,534,068 B2
(45) Date of Patent: May 19, 2009

(54) RECYCLING OF ASPHALTIC CONCRETE

(75) Inventors: Fred John Brouillette, Colleyville, TX (US); Max Dan Richwine, Arlington, TX (US); Clifford William Ryan, Allen, TX (US)

(73) Assignee: Texas Industries, Inc., Dallas, TX (US)

( * ) Notice: Subject to any disclaimer, the term of this patent is extended or adjusted under 35 U.S.C. 154(b) by 678 days.

(21) Appl. No.: 11/118,582

(22) Filed: Apr. 29, 2005

(65) Prior Publication Data

US 2006/0243170 A1 Nov. 2, 2006

(51) Int. Cl.
*E01C 11/00* (2006.01)
(52) U.S. Cl. .......................................... 404/72; 404/75
(58) Field of Classification Search ................. 404/80, 404/81, 75, 90, 72
See application file for complete search history.

(56) References Cited

U.S. PATENT DOCUMENTS

| | | | |
|---|---|---|---|
| 3,948,830 | A | 4/1976 | Donnelly et al. |
| 5,725,655 | A | 3/1998 | Catterton et al. |
| 5,766,333 | A | 6/1998 | Lukens |
| 5,788,407 | A * | 8/1998 | Hwang ................... 404/81 |
| 5,791,814 | A | 8/1998 | Wiley |
| 5,843,222 | A | 12/1998 | Miller et al. |
| 6,206,607 | B1 * | 3/2001 | Medico et al. ............ 404/2 |
| 6,231,663 | B1 | 5/2001 | Catterton et al. |
| 7,284,345 | B2 * | 10/2007 | Schenk ................... 37/403 |
| 2002/0172555 | A1 * | 11/2002 | Crupi ..................... 404/77 |

* cited by examiner

*Primary Examiner*—Raymond W Addie
(74) *Attorney, Agent, or Firm*—Locke Lord Bissell & Liddell, LLP

(57) ABSTRACT

Method of recycling a crushed asphalt concrete comprising a friable mixture of asphalt and aggregate particles produced by breaking down a recycled asphalt/aggregate concrete by milling or crushing or the like. The aggregate particles include a substantial portion of the surfaces thereof which are substantially free of adhered asphalt material. The crushed asphalt concrete is mixed with a minor amount of hydraulic cement and water to produce a plastic mixture of the crushed asphalt concrete and hydraulic cement. The plastic mixture is transported to a utilization site such as a building site, road or parking lot and spread on a substrate surface to provide a layer of asphalt concrete pavement. The layer of asphalt concrete pavement has a 7-day compressive strength, typically no more than 1,000 psi, e.g., 150-800 psi. The cement is present in an amount within the range of 1-14 wt. %, more specifically, within the range of 2-10 wt. % of the crushed asphalt concrete and any added aggregate. A mixing assembly comprises a moveable conveyor which loads to a mixing mill. The crushed asphalt concrete is deposited on the conveyor to provide a relatively thin layer of the crushed asphalt concrete. Hydraulic cement is dispensed on the layer of crushed asphalt concrete and the crushed concrete and hydraulic cement is conveyed to the mixing mill. Water is added in an amount effective to produce a plastic mixture. The plastic mixture is recovered from the mixing mill and transferred to a utilization site.

1 Claim, 3 Drawing Sheets

RECYCLING OF ASPHALTIC CONCRETE

FIELD OF THE INVENTION

This invention relates to the recycling of asphalt materials and more particularly, to the recycling of scrap asphalt concrete which has been recovered, then crushed and mixed with hydraulic cement and utilized to provide an asphalt concrete paving structure.

BACKGROUND OF THE INVENTION

Asphalt may be characterized as an organic cementitious material in which the predominant constituents are bitumens as they may occur in nature or as they may be produced as byproducts in petroleum refining operations. Asphalt materials and the standards to be applied in asphalt paving applications are described in the booklet entitled SUPERPAVE Series No. 1 (SP-1) "Performance Graded Asphalt Binder Specification and Testing," $3^{rd}$ Edition, 2003, published by the Asphalt Institute, Research Park Drive, P.O. Box 14052, Lexington, Ky. 40512-4052. Asphalts can generally be characterized as a dark brown or black solid or highly viscous liquid which incorporates a mixture of paraffinic and aromatic compounds and various heterocyclic compounds containing Group 15 or 16 elements (new notation), such as nitrogen, oxygen or sulfur. Typical analyses of asphalt cements employed in forming asphalt concretes are disclosed in the aforementioned SUPERPAVE booklet in Chapter 1 under the subheading "Chemical Composition of Asphalt" found on pages 3-6.

Asphalt paving materials based upon asphalt binder or "cements" and aggregate mixtures, commonly referred to as "asphalt concrete" or macadam, are used in many applications such as in the resurfacing of streets, parking lots and the like which are subject to vehicular traffic. While the asphalt may be used alone, such as where it applied as a relatively thin film on existing paving structure, it is usually used in an asphalt concrete in which the asphaltic base material is mixed with a aggregate in an amount substantially in excess of the amount of the asphalt. Typically, an asphalt concrete may contain about 5-20 wt. % asphalt binder with the remainder being the aggregate material. The asphalt binder material may be modified through the use of polymers to produce polymer-modified asphalts and may further incorporate additional additives such as ground rubber, also called crumb rubber. It may also incorporate elastomeric-type polymers, such as polybutadiene, polyisoprene or polyisobutene rubber, polymethacrylate and ethylene propylene diene terpolymer. As described in the aforementioned SUPERPAVE booklet under the subheading "Aging Behavior," asphalt can degenerate because of oxidation of its component compounds and devolatilization, in which volatile components gradually evolve from the asphalt. Thus, the asphalt paving materials, when first laid down, tend to be in a relatively resilient state in which they are impacted, but not fractured, under the stress imposed by vehicular traffic. With the passage of time and the release of the more volatile components from the asphalt, as well as oxidative hardening, the asphalt tends to age and become brittle. Thus, particularly in the case of heavily traveled paving surfaces, the asphalt concrete becomes less resilient and as the surfaces lose their resiliency, the pavement fractures under applied stress and the asphalt concrete becomes heavily fractured. The fractures occur initially at the surface where the asphalt tends to be most heavily devolatized and oxidized. Thus the pavement near the surface can be characterized as "dead" asphalt, while the lower portion of the asphalt has a higher volatiles content and thus retains some resiliency.

Once the asphalt pavement becomes "dead" where it largely loses its effectiveness as a pavement surface, the pavement can be broken up and removed. Alternatively, the asphalt concrete material can be left in place and treated by the addition of additional material, such as asphalt cement or hydraulic cement, and then recompressed to form a new paving structure. Typically, the new structure would be used as a base and covered with a relatively thin film of asphalt or possibly an asphalt concrete having relatively fine aggregate components.

SUMMARY OF THE INVENTION

In accordance with the present invention, there is provided a method of recycling an asphalt-based material. In carrying out the invention, there is provided a crushed asphalt concrete comprising a friable mixture of asphalt and aggregate particles produced by breaking down a recycled asphalt/aggregate concrete by any suitable technique such as by milling or crushing, or by a combination of such operations. The aggregate particles in the friable mixture include a substantial portion of the surfaces thereof which are substantially free of adhered asphalt material. The crushed asphalt concrete is mixed with a minor amount of hydraulic cement and water to produce a plastic mixture of the crushed asphalt concrete and hydraulic cement in which the crushed asphalt concrete is the predominant component. The plastic mixture is transported to a utilization site such as a building site, road or parking lot and the like, and spread on a substrate surface to provide a layer of asphalt concrete pavement. The term "pavement" is used herein to denote any load bearing pavement structure regardless of the use to which the pavement structure is put. Thus, the term "pavement" denotes foundation slabs such as are use to provide building pads, channel linings in irrigation channels, tarmacs and other surfaces as well as the paving surfaces normally encountered on roadways, bicycle and walk paths, parking lots and the like.

Preferably, the layer of asphalt concrete pavement has a 7-day compressive strength of no more than 1,500 psi and usually no more than 1,000 psi. More specifically, the asphalt concrete pavement exhibits a 7-day compressive strength within the range of 150-800 psi. In the mixture of crushed asphalt concrete and hydraulic cement, the cement is present in an amount within the range of 1-14 wt. % of the crushed asphalt concrete and any added aggregate. Preferably, the hydraulic cement is present in an amount within the range of 2-10 wt. %.

Preferably, the plastic mixture is formed by initially contacting the cement and the crushed asphalt concrete, followed by adding water to the crushed asphalt concrete and the cement. In a preferred embodiment of the invention, this is accomplished by disposing the crushed asphalt concrete on a support surface to provide a relatively thin layer of the crushed asphalt concrete and the hydraulic cement is then added by dispersing the hydraulic cement on the surface of the layered crushed asphalt concrete.

The asphalt in the recycled asphalt concrete preferably has a volatiles content which is no more than 50% of the original volatiles content of asphalt concrete from which the crushed asphalt concrete is derived. Preferably, the asphalt in the crushed asphalt concrete has a volatiles content of no more than 0.1 wt. %. In addition, it is preferred that the plastic mixture be transported to the utilization site and spread on the substrate surface within two hours after mixing of the aggregate cement mixture.

In a further aspect of the invention, there is provided a mixing assembly comprising a moveable conveyor surface which loads to a mixing mill. The crushed asphalt concrete is deposited on the conveyor surface to provide a layer of the crushed asphalt concrete having a depth which is substantially less than the width of the crushed asphalt concrete on the conveyor surface. A minor amount of the hydraulic cement is then dispensed on the layer of crushed asphalt concrete and the crushed concrete and hydraulic cement is conveyed to the mixing mill. Subsequent to the addition of the hydraulic cement and subsequent to or prior to the supply of the hydraulic cement and crushed asphalt concrete into the mixing mill, water is added in an amount effective to produce a plastic mixture. The plastic mixture of crushed asphalt concrete and the hydraulic cement is recovered from the mixing mill and then transferred to a utilization site where it is spread and compacted to provide a layer of asphalt concrete pavement.

In a further embodiment of the invention, an aggregate is added on to the conveyor surface along with the supply of crushed asphalt concrete to the conveyor surface. The additional aggregate is added prior to the addition of the hydraulic cement to the original supply of crushed asphalt concrete on the conveyor surface. In a further aspect of the invention, the crushed asphalt concrete is supplied to the conveyor surface in at least two successive increments.

DETAILED DESCRIPTION OF THE INVENTION

Figure 1:
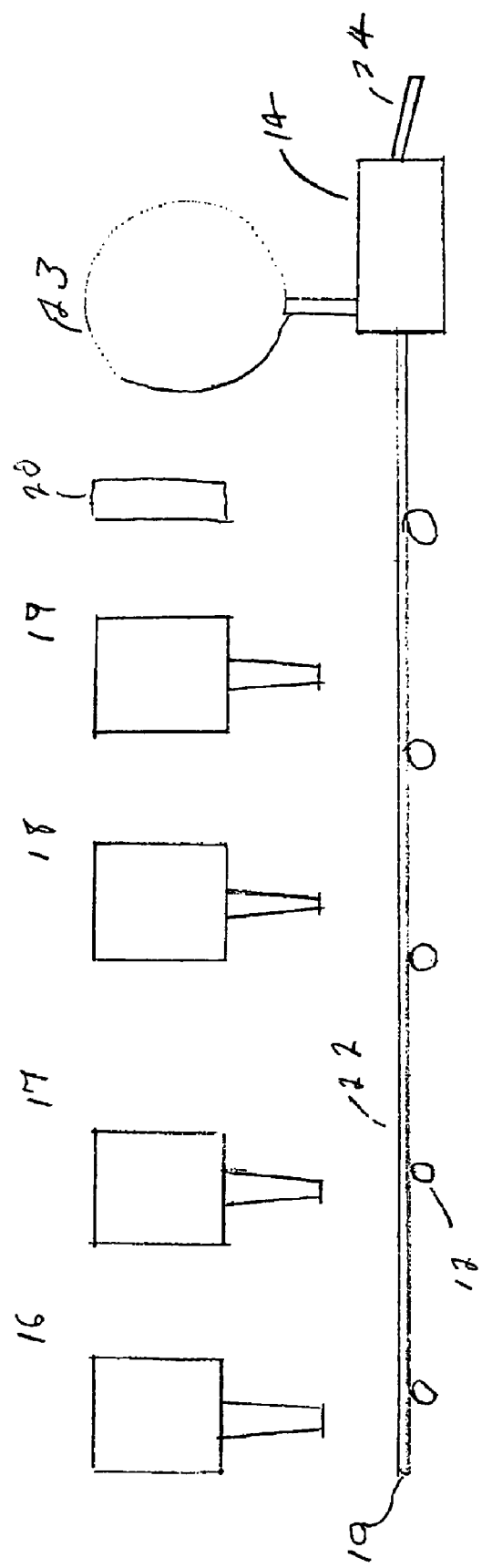
FIG. 1 is a schematic side elevational view of a conveyor-mixing system suitable for carrying out the invention.

Asphalt concretes which incorporate an aggregate component and an asphalt binder component are widely used as paving materials on surfaces such as roadways and parking lots. Asphalt concrete typically is applied by forming a mixture of the aggregate particles with molten asphalt binder material which is then applied to the roadway or other surface, where it hardens as the asphalt cools. Typically, the molten asphalt concrete is prepared at a batching plant by mixing the asphalt binder and aggregate and then transferred by truck to the road site where the molten asphalt concrete is applied through a slip form or other suitable means, and then as it is cooled, it is rolled to provide the final pavement.

Asphaltic concrete, comprising asphalt binder and aggregate, as well as asphalt compositions for resurfacing asphaltic concrete, should exhibit desirable mechanical properties including characteristics involving desirable levels of elasticity and plasticity. As noted previously, various polymers can be added to asphalts to improve physical and mechanical performance properties. Polymer-modified asphalts are routinely used in the construction of roads and other paving surfaces. Conventional asphalts often do not retain sufficient elasticity in use and, also, exhibit a plasticity range that may be too narrow for use in some road construction applications. The characteristics of road asphalt concretes and the like can be improved by the incorporation of elastomeric-type polymers such as those disclosed previously as well as other polymers such as ethylene/vinyl acetate copolymer, polyacrylate, polymethacrylate, polychloroprene, polynorbornene, and random or block copolymers of styrene and a conjugated diene. Such modified asphalts commonly are referred to as bitumen/polymer binders or asphalt/polymer mixes. Modified asphalt binders and asphalt emulsions typically are produced utilizing styrene/butadiene based polymers, and typically have raised softening point, increased viscoelasticity, enhanced strain recovery, and improved low temperature strain characteristics. The polymer may be added along with a sulfur-based reactant that promotes cross-linking of the polymer molecules to provide the desired asphalt properties.

As the polymer concentration is increased, the working viscosity of the asphalt mix may become prohibitively high and separation of the asphalt and polymer may occur. The high viscosities experienced at increased polymer concentrations may make emulsification of the asphalt difficult. Asphalt-water emulsions are desirable in many applications because the emulsion may be applied at lower temperatures than hot-mix asphalts since the water acts as a carrier for the asphalt particles. For example, hot-mix asphalts, mixes of asphalt, aggregate, and a single polymer, commonly are applied at a temperatures within the range of about 250° F. to 350° F. to achieve the requisite plasticity for application. In contrast, an asphalt emulsion typically may be applied at lower temperatures within the range of about 35° F. to 85° F. with the same working characteristics. Emulsified asphalt products are generally used to reduce the release of environmentally-harmful volatile organic compounds often associated with asphalts diluted with light carrier solvents such as diesel fuel, naphtha, and the like. Emulsification basically requires that the asphalt and any desired performance-enhancing additives be combined with an emulsifying agent in an emulsification mill along with about 20 to 40 percent by weight of water. However, high polymer loading in asphalt produces high viscosities and melting points, making emulsification of the polymer-asphalt composition difficult.

Regardless of the nature of the binder in an asphalt concrete, the asphalt concrete, when it is first laid down and allowed to cure, forms a highly resilient paving surface which is not easily ruptured by the compressive stresses imposed by vehicular traffic. At this stage of its use, asphalt binder contains significant quantities of relatively low molecular weight products which add to the resiliency of the higher molecular weight bitumen forming the predominant part of the asphalt binder. These lower molecular weight components, often referred to as volatiles, typically have a boiling point of about 200 to 225° F. at one atmosphere. These volatile components are gradually lost from the asphalt with the passage of time. This loss of volatiles is particularly pronounced under high temperature conditions and high traffic conditions.

The loss of resiliency in the asphalt paving structure is generally most pronounced at the surface of the paving. Oftentimes, the paving structure, when it reaches the point where it is considered to no longer be useful, will still retain resiliency at the lower portions near the subgrade. Thus, the asphalt paving structure, when it is taken up and ultimately crushed so that it may be recycled or disposed of in a landfill, can contain portions of "dead" asphalt while at the same time having portions of more resilient "live" asphalt. The dead asphalt binder can be differentiated from the live asphalt binder in crushed asphalt concrete in terms of its physical properties. The crushed asphalt concrete containing dead asphalt binder is highly friable and crumbles easily so that the asphalt binder does not readily adhere to the surfaces of the aggregate particles. The recycled asphalt concrete containing substantial amounts of "live" asphalt binder is much less friable and rather than crumbling under release of compressive stress, will tend to form a less friable, more massive material which retains its integrity and it is not as easily crumbled. The live asphalt concrete is characterized by asphalt more readily adhering to the surfaces of the aggregate material than is the case with dead asphalt. The crushed recycled asphalt concrete employed in carrying out the present invention advantageously has the characteristics of a dead asphalt binder material. This material can be mixed with a minor amount of hydraulic cement, which after hydration with water, can be used to provide and asphalt paving surface which is relatively low in compressive strength and provides good compressability. This material can be advantageously used to provide a subgrade which can be covered with another paving material which is asphalt concrete or Portland cement-based concrete.

Turning now to the drawings, FIG. 1 illustrates a mixing assembly which can be used in carrying out the embodiment of the invention in which a crushed asphalt concrete as described above can be disposed on the surface of a conveyor followed by dispersing a hydraulic cement onto the layer of crushed asphalt concrete. The layer of crushed asphalt concrete and hydraulic cement is then supplied into a mixing mill. Water is sprayed into contact with the cement and crushed asphalt aggregate prior to mixing least a portion of the mixture of the asphalt aggregate and asphalt binder within the mill. More particularly and as illustrated in FIG. 1, the mixing system disclosed there comprises a conveyor 10 which is supported on a plurality of rollers 12 which are rotated in order to advance the conveyor in the direction of a mixing mill 14. Mixing mill 14 may be of any suitable type but preferably will take the form of an elongated pug mill. A preferred type of pug mill for use in the invention is a dual pug mill equipped with two counter-rotating agitators disposed longitudinally of the pug mill. A suitable pug mill is available from Aran America under the designation Model # ASR-25E.

The mixing system further is equipped with a plurality of hoppers 16-19 for dispensing crushed asphalt concrete an optionally for the supplemental addition of additional aggregate particles to the crushed asphalt concrete. More particularly and as illustrated in FIG. 1, hoppers 16 and 17 each contain crushed asphalt concrete to provide for the supply of the crushed asphalt concrete onto the surface of the conveyor 10 in two successive increments. By supplying the crushed asphalt in a plurality of increments, a relatively even distribution of crushed asphalt concrete is formed on the conveyor surface which can be more readily contacted by the subsequent addition of the hydraulic cement component. Thus, as shown in FIG. 1, the crushed asphalt concrete is formed in the surface of the conveyor 10 in a relatively thin layer 22 which has a depth on the conveyor surface which is substantially less than the width of the crushed asphalt mixture on the conveyor surface. For example, in a system employing a dual pug mill having a maximum capacity of about 500 tons per hour, the conveyor 10 may have a width of about 3-4 feet and the crushed asphalt concrete is disposed on the conveyor to provide a layer of crushed asphalt 22 having an average thickness of about 2-6 inches.

In further operation of the mixing system shown in FIG. 1, the hydraulic cement component is fed from dispenser 20, normally located immediately before the mill 14, and spread over the surface of the layer of crushed asphalt concrete 22. The hydraulic cement preferably is added in an amount within the range of 1-14 wt. %, and more preferably within the range of about 2-10 wt. % of the crushed asphalt concrete. Additional amounts of hydraulic cement can be employed, but this will usually not be desirable since the asphalt concrete layer ultimately formed is preferred to have a relatively low compressive stress to provide good compressability. Since the material will often be employed as a base material on which an additional paving surface is imposed, it will be desirable to provide for good compressability of the ultimate base material.

In one embodiment of the invention, an additional aggregate material may be supplied via hopper 18 and/or hopper 19 to the mixture on the conveyer 10. The supplemental aggregate material should have a particle size distribution similar to the particle size distribution appearing in the crushed asphalt aggregate mixture as described below. The added aggregate material supplied via hoppers 18 and 19 should be limited in amount to ensure that the crushed recycled asphalt concrete (supplied via hoppers 16 and 17) remains the predominant component in the hydraulic cement, crushed asphalt concrete blend. This is important in order to retain significant recycled asphalt binder in the ultimate mixture to provide for good compressability in the final product. Thus, in adding additional aggregate from any source it should be added in an amount which is less than the amount of the crushed recycled asphalt concrete. Preferably, the additional aggregate supplied from hopper 19 should be less than ½ by weight of the recycled crushed asphalt concrete supplied from hoppers 16 and 17. More preferably, the additional aggregate is less than 30 wt. % of the recycled asphalt concrete.

Variations in the order of addition as described above may be employed in practicing the present invention. For example, crushed asphalt concrete may be dispensed onto the conveyor surface via hoppers 16 and 18 with an intermediate addition of supplemental aggregate via hopper 17. Also, the supplemental addition of aggregate via hopper 19 may be dispensed with or, alternatively, additional crushed asphalt concrete may be supplied via hopper 19.

After or immediately before the supply of the mixed material to the mixing mill, water is added-in an amount effective to provide a plastic mixture of the crushed asphalt concrete and hydraulic cement within the mixing mill. Preferably, the water will be added from tank 23 at the front of the mixing mill in order to ensure that the plastic mixture of crushed asphalt concrete, hydraulic cement and water is formed in a relatively homogeneous mixture within the mixing mill. The water preferably will be added in an amount to provide a water content within the range of about 6-10 wt. % of the mixture in the mixing mill. More specifically, the final water content of the plastic mix will usually be within the range of 7-8 wt. %. In many cases, where supplemental aggregate is employed, the supplemental aggregate may contain substantial amounts of water. In this case, the water to be supplied from tank 23 will be added taking into account the amount of water in the supplemental aggregate. In some cases where the supplemental aggregate has a very high water content, it may be unnecessary to add additional water from water supply 23.

In one embodiment of the invention, a water-reducing agent conforming to ASTM C-494 is added to the mixture prior to the addition of the water.

The hydrated mixture is withdrawn from the mill 14 and supplied by way of a loading chute 24 to a suitable product hopper for a conveyance, such as dump truck or the like (not shown). The mixture is then transported to the site where it is to be used and spread on to a substrate surface where it is graded and allowed to set to form the substrate surface. After the addition of the water, the plastic mixture has a relatively short "pot time" and it should be spread onto the substrate surface within about two hours after mixing in the mixing mill 14. Under high temperature conditions, for example where the ambient temperature is about 100° F. or above or under windy or low humidity conditions, the pot time will be somewhat shorter and the aggregate mixture is preferably spread within one hour after mixing.

In a further aspect of the present invention, glass fibers may be incorporated into the crushed asphalt concrete prior to supply of the concrete to the mixing mill. The glass fibers may range in length from about ½ to 3 inches, and more specifically, within the range of about ½ to about 1½ inches. The length of the glass fibers can vary depending upon the size of the aggregate in the crushed asphalt concrete mixture, with larger sized aggregates calling for somewhat longer fibers. The glass fibers may be of any simple type such as Class AR fibers available from Saint-Gobain Vetrotex America-BUS-PER. Preferably, the fibers will have a diameter of about 60 denier.

In a further embodiment of the invention, the crushed asphalt concrete, with or without the addition of more aggregate, may be supplied to a conveyor system incorporating a sieve shaker in order to avoid the supply of unacceptably large particles to the mixing mill. An embodiment of the invention incorporating this feature as well as providing for the addition of glass fibers is illustrated in FIG. 2, which schematically shows the system for the supply of crushed asphalt concrete, aggregate, and fibers to the mixture to be supplied to the mixing mill.

Figure 2:
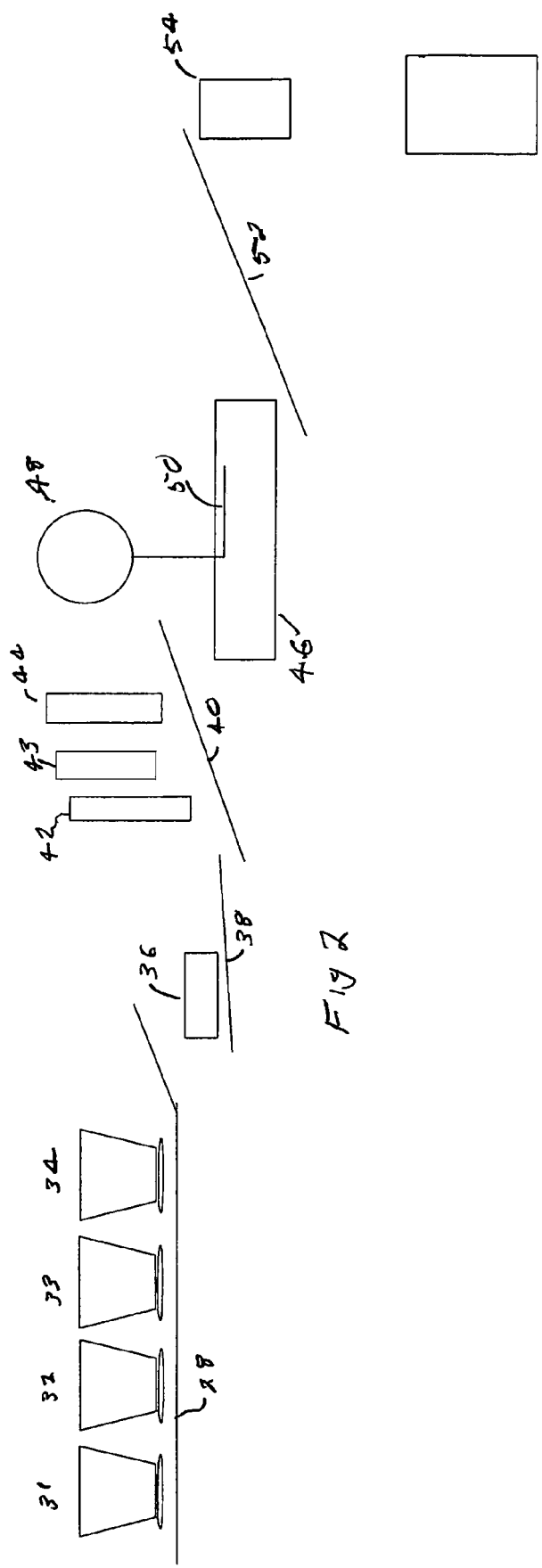
FIG. 2 is a schematic illustrating another embodiment of a conveyor mixing system for carrying out the invention.

More particularly and as shown in FIG. 2, there is illustrated a system comprising an initial conveyor belt 28 which is supplied with materials from bins 31, 32, 33 and 34. Bins 31-34 may be filled with crushed asphalt concrete and supplemental aggregate as needed. The crushed asphalt concrete and the supplemental aggregate may be added in any desired sequence. For example, crushed asphalt concrete may be supplied to the conveyor belt 28 via hoppers 31 and 33 and supplemental aggregate via hoppers 32 and 34.

The initial conveyor belt 28 empties into a 2-inch sieve shaker 36 which, in turn, supplies its output to a secondary conveyor belt 38. As noted previously, the sieve shaker may be set to retain particle sizes greater than a desired maximum, for example, two inches. Where the crushed asphalt concrete and supplemental aggregate, if any, is finely graded, the sieve shaker 36 may be dispensed with.

The output from the sieve shaker 36 is supplied via a second conveyor belt 38 to a third conveyor belt 40. Conveyor belt 40 may be in the form of a weight belt conveyor system which weighs the amount of material on the conveyor belt and enables additives supplied via silos 42, 43 and 44 to be controlled depending upon the weight of the material on the conveyor belt 40. The glass fibers are supplied onto the crushed recycled asphalt concrete on they conveyor belt immediately before the hydraulic cement. Thus, the fibers are supplied via silo 43 and the hydraulic cement added immediately thereafter from silo 44 so that the cement covers the fibers as well as the other particulate material present. The glass fibers may be added in any suitable amount, but preferably will be within the range of about 1 to 2½ pounds per ton of dry material on the conveyor 40. If any additional material such as a water reducing agent or the like are employed, it normally will be added through silo 42 prior to the addition of the glass fibers.

The material on conveyor 40 is supplied to a mixing mill 46 such as twin shaft pug mill as described above. Water is supplied from a tank 48 through a water distribution system 50, such as a sparger, to the pug mill. The output from the pug mill is then applied to a final conveyor belt 52 and is supplied to a storage hopper 54 and ultimately to a vehicle (not shown) used to transport the material to the utilization site.

The layer of recycled asphalt concrete paving often will be employed as a subgrade for a final paving material. The final paving material may be an asphalt concrete or a hydraulic cement concrete. The recycled asphalt paving material normally will be laid down to provide a subgrade thickness of about 3-12 inches. The final paving surface may be an asphalt concrete, a hydraulic cement concrete as described above, or it may be a layer of asphalt (without the addition of aggregate) having a thickness of 2-6 inches.

As noted previously, the crushed recycled asphalt concrete will normally have an average particle size within the range of about ¼-¾ inch. A substantial portion of the aggregate particles have an exposed surface area which is substantially free of adhered asphalt material. Preferably, at least 50 wt. % of the aggregate particles, having an average particle size retained on a No. 4 sieve, will have an exposed surface area which is substantially free of adhered asphalt material. The material allows the plastic slurry to be formed with a relatively small amount of hydraulic cement to allow the ultimate formation of a sub-base material of relatively low compressive strength and high compressability as described previously. In a preferred embodiment of the invention, the particles in the crushed asphalt concrete have a sieve analysis as set forth in Table I.

TABLE I

| Sieve Size | Percent Retained | Percent Passing | Percent Retained Ranges |
|---|---|---|---|
| 1¾" | 0 | 100 | 0 |
| 1¼" | 0 | 100 | |
| 1" | 1 | 99 | |
| ⅞" | 3 | 97 | 0-35 |
| ¾" | 7 | 93 | |
| ½" | 15 | 85 | |
| ⅜" | 22 | 78 | 10-55 |
| #4 | 43 | 57 | 30-70 |
| #8 | 59 | 41 | |
| #16 | 69 | 31 | |
| #40 | 78 | 22 | 60-85 |
| #50 | 81 | 19 | |
| #80 | 86 | 14 | |
| #100 | 87 | 13 | |
| #200 | 90 | 10 | 85-100 |

While any suitable hydraulic cement may be employed in carrying out the present invention, it will be preferred that the hydraulic cement be selected from the group consisting of Type I, Type I/II, Type II, and Type III Portland cement mixtures thereof. Other cements such as Type IP or slag cement may be employed. A particularly preferred hydraulic cement is Type I/II Portland cement.

In experimental work respecting the present invention, recycled asphalt concrete in which the asphalt binder had a very low volatiles content was crushed to provide a mixture of asphalt binder material and aggregate particles. The asphalt binder material was "dead" as evidenced by the friable character of the binder material and aggregate. The mixture was characterized by virtually no elasticity so that the asphalt binder easily crumbled and did not readily adhere to the surfaces of the aggregate in the mixture. The aggregate had an average particle size of about ¼-¾ inch and was easily separated from the binder material. When an effort was made to manually compress the mixture of asphalt binder material and aggregate, upon release of the compressive force, the mixture fell apart under its own weight so that the asphalt binder material was, for the most part, segregated from the aggregate particles. The mixture of binder material and aggregate particles was blended with Type I/II hydraulic cement in an amount of about 87 wt. parts binder and aggregate and about 5 wt. parts cement. This mixture was then mixed with about 8 wt. parts water and the plastic mixture was then compacted and set in forms to form blocks having a thickness of about 3½ inch. The blocks were found to have a compressive stress to fracture after curing for 7 days of about 500 psi.

Figure 3:
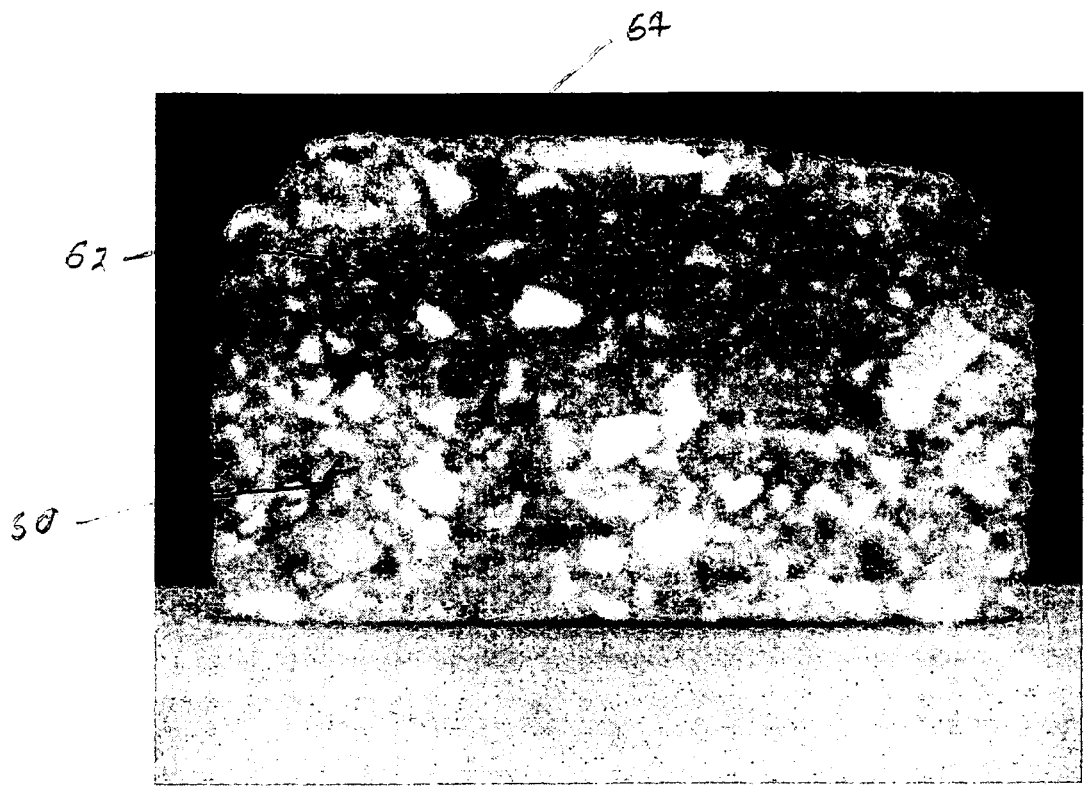
FIG. 3 is a side elevational view of an internal face of a block of cured asphalt concrete paving formed in accordance with the present invention.

An internal face exposed by sawing the block in two is shown in FIG. 3 which is a photograph of the face. In FIG. 3, the asphalt treated with cement is gray in color; the aggregates are generally white or dark gray and portions of the original asphalt which were not contacted with the hydraulic cement are black in color. As shown in the areas indicated by reference characters 60, 62 and 64, only a few of the aggregate particles, primarily those of small particle size of about ¼ inch or less, are embedded in or have substantial surface area contacted by the original asphalt. For the most part, the particles have surfaces indicated by the gray areas surrounding the particles which are free of the original asphalt binder.

Having described specific embodiments of the present invention, it will be understood that modifications thereof may be suggested to those skilled in the art, and it is intended to cover all such modifications as fall within the scope of the appended claims.

The invention claimed is:

1. A method of recycling an asphalt based material comprising:
   (a) providing a crushed asphalt concrete comprising a friable mixture of asphalt binder material and aggregate particles with a substantial portion of the surfaces of the aggregate particles being substantially free of adhered asphalt material produced by crushing a recycled asphalt concrete;
   (b) mixing said crushed asphalt concrete material with a minor amount of hydraulic cement and water to produce a plastic mixture of said crushed asphalt concrete and said hydraulic cement in which said crushed asphalt concrete is the predominant component; and
   (c) transporting said plastic mixture to a utilization site and spreading said mixture onto a substrate surface to provide a layer of asphalt concrete pavement,
   wherein the aggregate particles in said concrete have the following sieve analysis:

| Sieve Size | Percent Retained | Percent Passing | Percent Retained Ranges |
|---|---|---|---|
| 1¾" | 0 | 100 | 0 |
| 1¼" | 0 | 100 | |
| 1" | 1 | 99 | |
| ⅞" | 3 | 97 | 0-35 |
| ¾" | 7 | 93 | |
| ½" | 15 | 85 | |
| ⅜" | 22 | 78 | 10-55 |
| #4 | 43 | 57 | 30-70 |
| #8 | 59 | 41 | |
| #16 | 69 | 31 | |
| #40 | 78 | 22 | 60-85 |
| #50 | 81 | 19 | |
| #80 | 86 | 14 | |
| #100 | 87 | 13 | |
| #200 | 90 | 10 | 85-100. |

* * * * *